March 11, 1941. J. KOLBE 2,234,676
AUTOMOTIVE VEHICLE
Filed April 10, 1939 2 Sheets-Sheet 1

INVENTOR
Joachim Kolbe.
BY Duke, Calmer & Gray
ATTORNEYS.

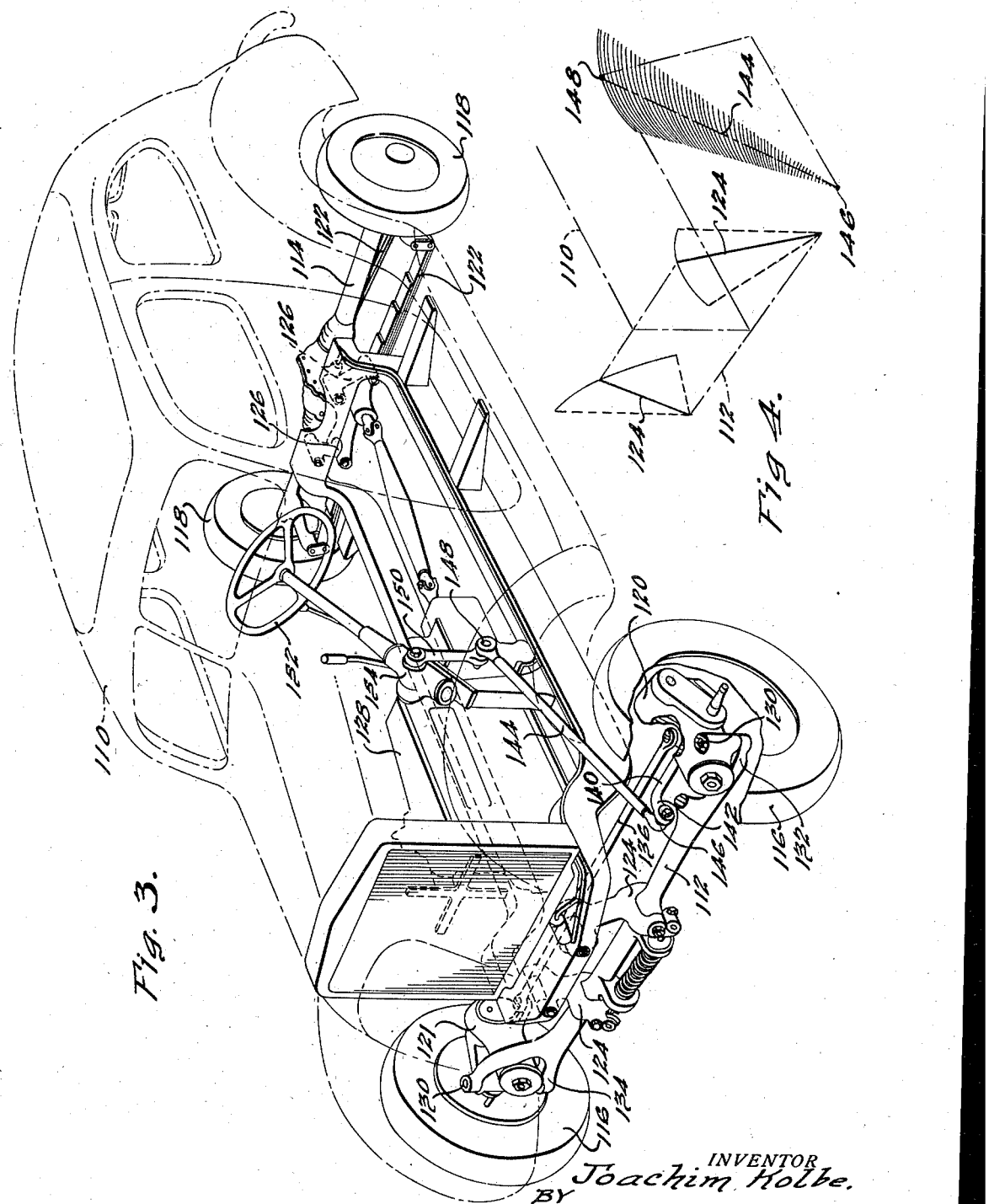

Patented Mar. 11, 1941

2,234,676

UNITED STATES PATENT OFFICE 2,234,676

AUTOMOTIVE VEHICLE

Joachim Kolbe, Detroit, Mich.

Application April 10, 1939, Serial No. 267,008
In Germany May 6, 1938

13 Claims. (Cl. 280—124)

This invention relates to vehicles, and more particularly to improved connecting means between the superstructure and wheel supporting means of vehicles whereby the superstructure may assume an inclined or banked position when subjected to lateral forces.

One desirable form of connecting means consists in the provision of angularly inclined link members interposed between the superstructure and wheel supporting means, whereby the superstructure may assume an angularly inclined or banked position relative to the wheel supporting means when subjected to lateral forces. It is desirable that this connecting means be proportioned in such a manner as to minimize interference with other necessary elements of the vehicle, and that the usual control forces such for example as the steering, braking and power transmitting forces may be transmitted efficiently regardless of variations in the angular relation of the superstructure relative to the wheel supporting means.

I have discovered that it is unnecessary that the links, spaced longitudinally of the vehicle such as the front and rear links, be disposed at the same angle or be set at the same distance apart transversely of the vehicle, since satisfactory results are obtained if the links are positioned at such an angle and are of such length that they have the same center of motion in the neutral position and at all points during movement of the superstructure to an inclined or banked position.

The center of motion of the connecting means or links between the superstructure and wheel supporting means may be defined as the imaginary line or axis extending longitudinally of the vehicle at which the front and rear links or connecting means would intersect if extended. This imaginary line or axis shifts laterally and downwardly relative to the superstructure as the superstructure is shifted from a substantially normal or upright position to an inclined or banked position, depending on the variations in angular relation of the links. As the links shift from the normal position by movement of the superstructure to an inclined position, the imaginary axis shifts proportionately to and with the links, and always lies at the points where the links would intersect if they were extended. This shiftable imaginary line or axis is referred to herein as the center of motion. The center of motion of the links moves in the same direction as and proportionately to the movement of the center of gravity of the superstructure when it assumes an inclined or banked position, and that if extended the effective neutral axes of the links would intersect in substantially common horizontal and vertical planes extending longitudinally through the vehicle. I have also found that the front or rear links on one side of the vehicle may be staggered longitudinally of the vehicle relative to the links on the other side thereof.

An object of this invention is therefore to provide improved connecting means interposed between the superstructure and wheel supporting means and proportioned in such a manner as to minimize interference with other elements of the vehicle.

A further object is to provide novel steering control means having a movable element designed in a manner similar to a supporting link for use in a vehicle wherein the superstructure is so mounted that it may assume an inclined or banked position under the influence of lateral forces.

Another object of the invention is to provide connecting means including angularly inclined front and rear links interconnecting the superstructure and wheel supporting means wherein the links at the front may be of suitable length and may be transversely spaced apart at varying distances and extend at different angles than the links at the rear of the vehicle, thereby rendering it possible to avoid interference with other elements of the vehicle.

A still further object of the invention resides in the development of a method by which the necessary length and direction of supporting links or the direction and vertical length of a steering member may be determined when the length and angular direction of one supporting link is determined.

A still further object is to provide an improved steering mechanism for vehicles having a superstructure mounted on links on wheel supporting means in such a manner that it may assume an inclined or banked position, wherein means such as a bell crank mounted on the wheel supporting means and a steering reduction gear mounted on the superstructure are interconnected by an angularly inclined member whose direction and vertical length are proportional in such a manner as to have the same center of motion as the links and so that no steering forces are extended on the steering mechanism by movement of the superstructure to an inclined or banked position.

Yet a further object of the invention is to provide a universally mounted steering control member for use in vehicles wherein the superstructure is so mounted on the wheel supporting means that it may assume an inclined or banked position accompanied by lateral and downward movement when subjected to lateral forces wherein one end of the control member moves in a plane horizontal with the wheel supporting means, and its other end moves laterally and downward and rotates with the superstructure in such a manner that no steering forces are exerted on the steering mechanism by movement of the superstructure to the inclined or banked position.

Another object is to find the necessary length of a supporting link or the vertical length of a steering control member when the direction and length of a supporting link is known.

Other objects and advantages of this invention will be apparent from the following detailed description considered in connection with the accompanying drawings, submitted for purposes of illustration only and not intended to define the scope of the invention, reference being had for that purpose to the subjoined claims.

In the drawings wherein similar reference characters refer to similar parts throughout the several views:

Figure 3 is a perspective view of a vehicle embodying the invention; and

Figure 4 is a line diagram illustrating the operation of a portion of the device illustrated in Figure 3.

Figures 1, 2:
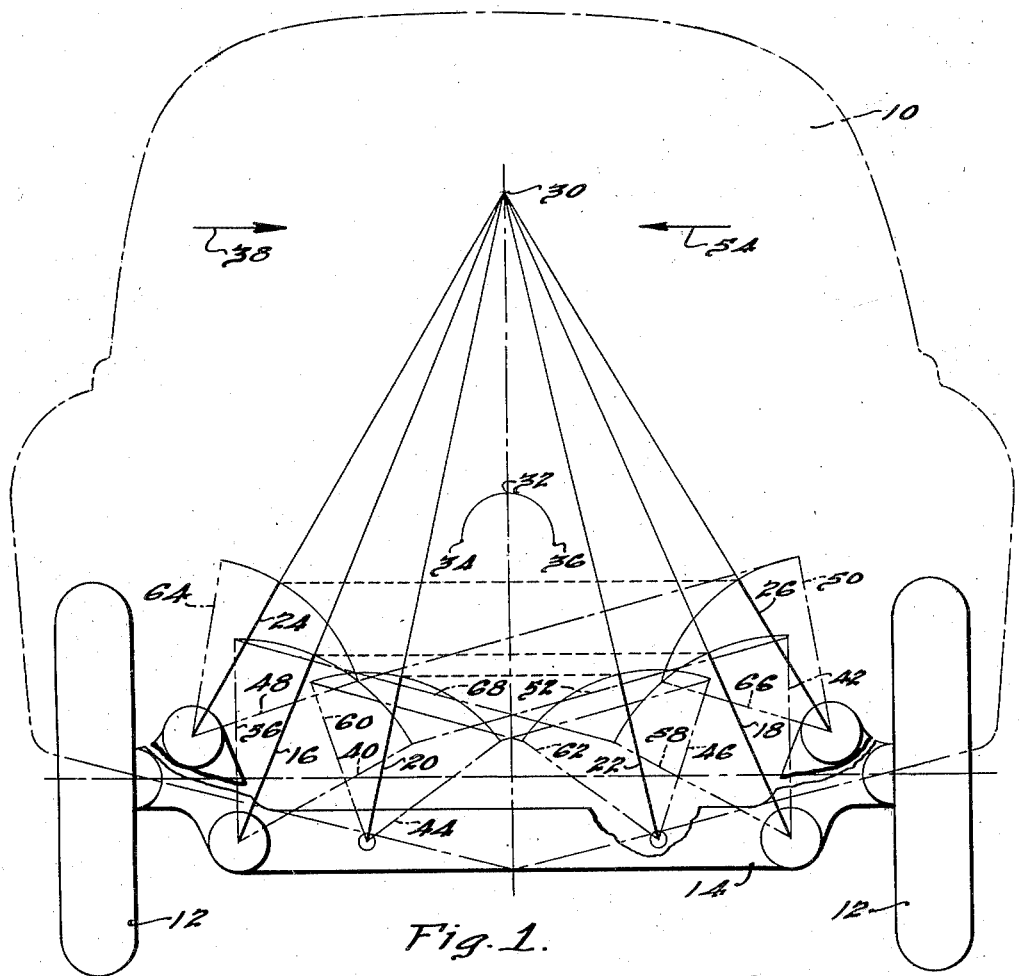
Figure 1 is a somewhat diagrammatic view in front elevation of a vehicle embodying the present invention.
Figure 2 is a line diagram illustrating one desirable method of determining the angular relation and length of connecting links or the direction and length of a steering member of the general type illustrated on Figure 1.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring more particularly to Figure 1, there is shown for purposes of illustrating the invention a vehicle having a body or superstructure 10, and wheels 12 carried by wheel supporting means 14. It will be understood that the wheel supporting means 14 may take any desired form, such for example as the transverse axle type illustrated, or the wheels 12 may be independently sprung, or any other known wheel supporting means may be employed. It will also be understood that although only one set of wheels 12 such for example as front wheels and wheel supporting means 14 are illustrated in Figure 1, it is intended that rear wheels and rear wheel supporting means shall also be employed as more clearly pointed out hereinafter.

The superstructure 10 is mounted on the wheel supporting means 14 by front and rear transversely spaced angularly inclined link members in such a manner that it may assume an inclined or banked position accompanied by a lateral and downward movement of its center of gravity relative to the wheel supporting means when subjected to lateral forces. It will be understood that any desired resilient means may be provided to exert a force on the superstructure or links to urge the superstructure back towards the normal or upright position as the forces inducing it to move to the banked position decrease, and that any desired form of resilient means may be interposed between the wheels and superstructure to cushion and absorb vertical impulses and shocks.

To minimize interference with other necessary elements of the vehicle such for example as the engine, the links need not be spaced the same distance apart at the front and rear of the vehicle. Three illustrative examples are shown on Figure 1, however it will be understood that one link system will be used at the front and another of these link systems will be used at the rear of the vehicle. The links need not necessarily be positioned in the manner illustrated since as hereinafter pointed out, they can be positioned at any desired points transversely of the vehicle, and may extend at varying angles as hereinafter more clearly pointed out. If desired however other link systems may be employed intermediate the front and rear linkages as in long vehicles such as for example as in busses, trucks, etc.

If it is desired to interpose the engine between the transversely spaced links, the link members may be spaced apart a sufficient distance to accommodate the engine, such for example, the link 16 and 18 of Figure 1 may be selected. The engine may of course be mounted either at the front of or at the rear end of the vehicle as desired. If it is desired to avoid interference with some of the necessary vehicle elements at the other end of the vehicle, the links at that end may be transversely spacd apart a different and suitable distance, such for example as the links 20 and 22, or the links 24 and 26. If the transverse distance between the links at the front and rear of the vehicle is different, the angularity of the links will vary to such an extent that a line extended through the effective neutral axis of all of the links will converge at spaced points in the same horizontal plane, such for example as the points 30. The center of gravity of the superstructure will preferably be in a plane below the points 30, as illustrated at 32, and will move laterally and downwardly towards the points 34 or 36 as the superstructure is moved to a banked or inclined position. It is of course necessary that the front and rear links have the same center of motion when the superstructure is in the normal or upright position, and have the same center of motion during movement of the superstructure to an inclined or banked position, and that this center of motion of the links move in the same direction and proportionately to the movement of the center of gravity 32 of the superstructure towards the parts 34 and 36 as the superstructure moves towards an inclined or banked position.

The connections between the wheel supporting means and one end of the links, and between the superstructure and the other end of the links, are preferably hinge or other suitable connections which permit transverse movement of the superstructure relative to the wheel supporting means. If desired any suitable means may be employed to interconnect the front and rear links to induce them to move in unison.

If now the superstructure 10 is subjected to a lateral force in the direction of the arrow 38, as when the vehicle rounds a curve to the right and is therefore subjected to centrifugal force, the links 16 and 18 at one end of the vehicle rotate about their connections with the wheel supporting means towards the positions 40 and 42, and the links 20 and 22, or 24 and 26 at the other end of the vehicle rotate about their connections with the other wheel supporting means towards the positions 44 and 46, or 48 and 50.

During this movement, the center of gravity of the superstructure moves from the position 32 towards the position 36, and the superstructure assumes an inclined or banked position as illustrated by the line 52 interconnecting the upper ends of the links in the actuated position.

If the superstructure 10 is subjected to a lateral force in the opposite direction as indicated by the arrow 54 as when the vehicle rounds a curve to the left, and is therefore subjected to centrifugal force, the links 16 and 18 at one end of the vehicle rotate about their connections with the wheel supporting means towards the positions 56 and 58, and the links 20 and 22, or 24 and 26 at the other end of the vehicle rotate about their connections with the other wheel supporting means towards the positions 60 and 62, or 64 and 66. During this movement, the center of gravity of the superstructure moves from the position 32 towards the position 34, and the superstructure assumes an inclined or banked position as illustrated by the line 68 interconnecting the upper ends of the links in the actuated position.

If desired the front or rear transversely spaced angularly inclined links may be positioned at different angles to each other, for instance the link 20 might be used on one side of the vehicle and the link 26 on the other side of the vehicle. It will also be apparent that if desired the link member on one side of the vehicle may be spaced longitudinally of the vehicle relative to the transversely spaced link member on the other side of the vehicle. Considerable flexibility of design is therefore possible whereby it is possible to incorporate my banking design in vehicles without extensive redesign of other parts of the vehicle.

The desirable length and angularity of other connecting links or the direction and vertical length of a movable steering member may be determined in the manner illustrated in Figure 2 when the angular relation and length of one supporting link, or the direction and vertical length of a movable steering member are known.

Assume that the length and angularity of one pair of links 70 and 72 to interconnect the superstructure with the wheel supporting means is known, the links 70 and 72 being connected to the wheel supporting means at the points 74 and 76 respectively and to the superstructure at the points 78 and 80 respectively. Assume also that it is desired to employ links at the other end of the vehicle which are spaced a different distance apart than the links 70 and 72, such for example that it is desired to connect the proposed links to the wheel supporting means at a point 82.

To find the angularity of the proposed links, the lines defining the effective neutral axes of the links 70 and 72 may be extended until they intersect at the point 84. A line is then drawn interconnecting the points 82 and 84 which determines the angularity of the proposed links.

To find the desired length of the link connected to the wheel supporting means at 82, extend a base line through the points 74 and 76 of the links 70 and 72. Extend the line 84—82 to intersect this base line at 86. Describe a segment of a circle 88 with 86 as a center and 84 a radius to intersect the base line 74—76 such as at the point 90. Extend a line through the points 90—78 to intersect the line 82—84 thus locating the point 92 on the line 82—84. Locate a point 93 on the extensions of the base line 74—76 which is spaced from the mid-point 91 a distance equal to the distance 86—91. Interconnect the points 84 and 93 thus locating the desired angle and transverse spacing of the link to cooperate with the link whose lower end is to be connected to the wheel supporting means at 82. Draw a line through 82 parallel to the base line 74—76 to locate the point 97 which corresponds to the point 82 of the desired links. Draw a line 95 through the point 92 parallel to the base line 74—76 to intersect the line 84—93 thus locating the point 94. These lines locate the points of connections of a link system 86, 93, 92 and 94. About point 82 as a center describe a segment of a circle 96 with 84 as a radius to locate the point 98 on a line 97 through 82 parallel to the base line 74—76. Extend a line 99 through 84 parallel to the base line 74—76, then extend a line through the points 90 and 78 to intersect the line 99 at 100. Extend a line from 100 to 98 crossing the line 82—84 at the point 102 which locates the upper point of connection of the link 82—102. Draw a line 101 parallel to the base line 74—76 through the point 102 to intersect the line 34—93 at 104 thereby locating the upper point of connection of the link 97—104. The upper ends of the link systems are therefore located at 102 and 104.

It will thus be apparent that when the length, angularity and transverse spacing of one pair of links has been decided upon, the length and angularity of another pair of links can be determined when the position of one of the ends of the links has been decided upon.

In designing the steering mechanism wherein an angularly inclined rod is employed to transmit steering movement from a steering wheel to a steering arm carried by the wheel supporting means and operably connected to the wheels to steer vehicles of this type, the angularly inclined rod may be designed as a link. When the length angularity and transverse spacing of a pair of links interposed between the wheel supporting means and superstructure has been decided upon, and the position of the free end of the steering arm is determined, the vertical length and angularity of the steering arm can be determined as pointed out above in connection with Figure 2.

If desired two or more pairs of angularly inclined links may be interposed between the superstructure and each of the front and rear wheel supporting means, and one of these pairs of links may be employed to actuate control members, such for example as steering, braking, shock absorbing means or other control elements.

Figure 3 is a perspective view of a vehicle embodying the invention wherein a body or superstructure 110 is mounted on front and rear wheel supporting means 112 and 114 having front and rear wheels 116 and 118 respectively. The front wheel supporting means 112 includes resilient spring means housed in chambers 120 and 121 carried by the left and right wheel supporting means respectively to cushion and absorb vertical shock and oscillations to which the vehicle is subjected, and the rear wheel supporting means is mounted on transversely extending leaf springs 122 for the same purpose. The superstructure 110 is mounted on the wheel supporting means by means of transversely spaced angularly inclined paired front and rear links 124 and 126 respectively. If desired the links 124 may be transversely spaced to straddle the engine 128 carried by the superstructure 110, and the rear links 126 may be spaced transversely at varying distances, and may be of suitable length and disposed at appropriate angles to conform to the principles discussed above, to avoid interference with other necessary parts of the vehicle.

The front wheels 116 may be mounted on king pins 130 extending through the bifurcated ends 132 and 134 of the left and right front wheel supporting means 112 respectively, the chambers 120 and 121 housing the resilient spring means projecting through the bifurcated portions 132 and 134 thereof. The rearwardly extending ends of the chambers 120 and 121 may be actuated by a transversely extending rod 136 to rotate them about the king pins 130 to steer the front wheels of the vehicle.

The chamber 120 of the left front wheel 116 may be provided with a transversely extending arm 140 whose outer end 142 is adapted to receive one end of an angularly inclined rod 144 connected thereto by means of a ball and socket or universal joint 146. The other end of the inclined rod 144 is connected by means of a ball and socket or universal joint 148 with an arm 150 actuated by means of a steering wheel 152 through suitable gearing housed in a casing 154.

The vertical length and angular direction of the rod 144 may be determined once the location and length of a pair of supporting links between the superstructure and wheel supporting means has been decided upon in accordance with the method pointed out above in connection with Figure 2. The desired position of the end 142 of the rod 144 may be laid out on a link diagram similar to Figure 2, and the vertical length and angular direction of the rod 144 determined in the manner pointed out in connection with Figure 2. The steering mechanism may then be proportioned in such a manner that the arm 150 will position the end of the rod 144 in the desired vertical plane and at the proper angle. When the superstructure moves to an inclined or banked position, the upper end of the rod 144 moves laterally, downwardly and rotates with it into the banked position proportionately with movement of the center of gravity of the superstructure, and the movement of the center of motion of the links.

Referring to Figure 4, it will be observed that as the superstructure moves to an inclined or banked position the angularly inclined rod 144 moves over the surface of a cone whose apex is at 146 and whose base is at 148 so that the rod 144 is not subjected to longitudinal forces which would exert steering forces on the arm 140.

Attention is called to the fact that if desired the lower end of the angularly inclined rod 144 may be connected to one arm of a bell crank carried by the wheel supporting means, the other arm of the bell crank being operably connected to the wheel supporting members to actuate the wheels to steer the vehicle.

It will of course be apparent that other connecting means comprising actuating members, such for example as brake, shock absorber and other control members may be interposed between the wheel supporting means and superstructure in the manner described above, since by the application of this invention it is possible to find for any point on or associated with the wheel supporting means, a suitable point on or associated with the superstructure whereby control forces may be transmitted.

I claim:

1. A vehicle having front and rear wheel supporting means, a superstructure, and connecting means comprising paired angularly inclined links interposed between the superstructure and the front and rear wheel supporting means, the transverse distance between the upper ends of said links and the transverse distance between the lower ends of said links being substantially constant and the transverse distance between the upper ends of said links being less than the transverse distance between their lower ends whereby the superstructure may assume an inclined or banked position relative to the wheel supporting means, the links interconnecting the front wheel supporting means and superstructure being disposed at a different angle than the links interconnecting the rear wheel supporting means and superstructure.

2. A vehicle having front and rear wheel supporting means, a superstructure, and connecting means comprising paired angularly inclined links interposed between the superstructure and the front and rear wheel supporting means, the transverse distance between the upper ends of said links and the transverse distance between the lower ends of said links being substantially constant and the transverse distance between the upper ends of said links being less than the transverse distance between their lower ends whereby the superstructure may assume an inclined or banked position relative to the wheel supporting means, the links interconnecting the front wheel supporting means and superstructure being different in length than the links interconnecting the rear wheel supporting means and superstructure.

3. A vehicle having front and rear wheel supporting means, a superstructure, and connecting means comprising paired transversely spaced angularly inclined links interposed between the superstructure and the front and rear wheel supporting means, the transverse distance between the upper ends of said links and the transverse distance between the lower ends of said links being substantially constant and the transverse distance between the upper ends of said links being less than the transverse distance between their lower ends whereby the superstructure may assume an inclined or banked position relative to the wheel supporting means, the links interconnecting the front wheel supporting means and superstructure being spaced apart transversely of the vehicle a different distance than the links interconnecting the rear wheel supporting means and superstructure.

4. In a vehicle having front and rear wheel supporting means, a superstructure having a normal or generally upright position, connecting means comprising transversely spaced angularly inclined links interposed between the front and rear wheel supporting means and the superstructure, the front links being transversely spaced at a different distance apart than the rear links whereby the superstructure may assume an inclined or banked position relative to the wheel supporting means accompanied by lateral and downward movement of its center of gravity, the center of motion of the front and rear links lying in substantially the same horizontal and vertical planes when the superstructure is in the normal or generally upright position and shifting progressively in substantially the same horizontal and vertical planes proportionately to movement of the center of gravity of the superstructure when it moves to an inclined or banked position.

5. In a vehicle having front and rear wheel supporting means, a superstructure having a normal or generally upright position, front and rear angularly inclined links interposed between the superstructure and wheel supporting means whereby the superstructure may assume an inclined or banked position relative to the wheel supporting means, an angularly inclined steering control member having a vertical component, the center of motion of said steering control member lying in substantially the same horizontal and vertical plane with center of motion of said inclined links when the superstructure is in the normal or generally upright position and when it moves to an inclined or banked position.

6. In a vehicle having steerable front wheels and rear wheels, supporting means for said front and rear wheels, a superstructure having a normal or generally upright position, front and rear angularly inclined links interposed between the superstructure and supporting means for the wheels whereby the superstructure may assume an inclined or banked position relative to the supporting means, means carried by the supporting means to steer the front wheels, an angularly inclined generally vertically extending steering control member operably connected to the last named means, the center of motion of said steering control member lying in substantially the same horizontal and vertical plane with center of motion of said inclined links when the superstructure is in the normal or generally upright position and when it moves to an inclined or banked position.

7. In a vehicle having front and rear wheel supporting means, a superstructure having a normal or generally upright position, front and rear transversely spaced angularly inclined links interposed between the wheel supporting means and superstructure whereby the superstructure may assume an inclined or banked position relative to the wheel supporting means, the front links being spaced transversely of the vehicle a different distance apart than the rear links and being proportioned and angularly inclined in such a manner that the center of motion of the front and rear links lie in substantially the same vertical and horizontal planes as the superstructure moves to an inclined or banked position.

8. In a vehicle having front and rear wheel supporting means, a superstructure having a normal or generally upright position, front and rear transversely spaced angularly inclined links interposed between the wheel supporting means and superstructure whereby the superstructure may assume an inclined or banked position relative to the wheel supporting means, the front links being of different length than the rear links and being positioned and angularly inclined in such a manner that the center of motion of the front and rear links lie in substantially the same vertical and horizontal planes as the superstructure moves to an inclined or banked position.

9. In a vehicle having front and rear wheel supporting means, a superstructure having a normal or generally upright position, front and rear transversely spaced angularly inclined links interposed between the wheel supporting means and superstructure whereby the superstructure may assume an inclined or banked position accompanied by lateral and downward movement of its center of gravity relative to the wheel supporting means, the front links being spaced transversely of the vehicle a different distance apart than the rear links and being proportioned and angularly inclined in such a manner that the center of motion of the front and rear links lie in substantially the same vertical and horizontal planes and shifts laterally and downwardly with and proportionately to the movement of the center of gravity of the superstructure as it moves to an inclined or banked position.

10. A linkage comprising paired front and rear transversely spaced angularly inclined link members having different lengths adapted to be interposed between a superstructure of a vehicle and the wheel supporting means thereof to induce the superstructure to assume an inclined or banked position relative to the wheel supporting means when subjected to lateral forces, the link members being proportioned and disposed in such a manner that their centers of motion lie in substantially the same vertical and horizontal planes as the superstructure moves to an inclined or banked position.

11. A linkage comprising paired front and rear transversely spaced angularly inclined link members disposed at varying angles and adapted to be interposed between a superstructure of a vehicle and the wheel supporting means thereof to induce the superstructure to assume an inclined or banked position accompanied by a lateral and downward movement of its center of gravity relative to the wheel supporting means when subjected to lateral forces, the link members being proportioned and disposed in such a manner that their centers of motion lie in substantially the same vertical and horizontal planes and shift laterally and downwardly with and proportionately to the movement of the center of gravity of the superstructure as it moves to an inclined or banked position.

12. In a vehicle having front and rear wheel supporting means, a superstructure having a normal or generally upright position, front and rear angularly inclined links interposed between the superstructure and wheel supporting means whereby the superstructure may assume an inclined or banked position relative to the wheel supporting means, an angularly inclined control member having a vertical component, the center of motion of said control member lying in substantially the same horizontal and vertical plane with center of motion of said inclined links when the superstructure is in the normal or generally upright position and when it moves to an inclined or banked position.

13. In a vehicle having front and rear wheel supporting means, a superstructure having a normal or generally upright position, connecting means comprising a plurality of pairs of transversely spaced angularly inclined links interposed between each of the front and rear wheel supporting means and the superstructure whereby the superstructure may assume an inclined or banked position relative to the wheel supporting means accompanied by lateral and downward movement of its center of gravity, at least one of said connecting means comprising a control member, the center of motion of the front and rear links and control member lying in substantially the same horizontal and vertical planes when the superstructure is in the normal or generally upright position and shifting progressively in substantially the same horizontal and vertical planes proportionately to movement of the center of gravity of the superstructure when it moves to an inclined or banked position.

JOACHIM KOLBE.